A. W. LIVINGSTON.
STONE SAWING MACHINE.
APPLICATION FILED SEPT. 10, 1908.
919,195.
Patented Apr. 20, 1909.
3 SHEETS—SHEET 2.
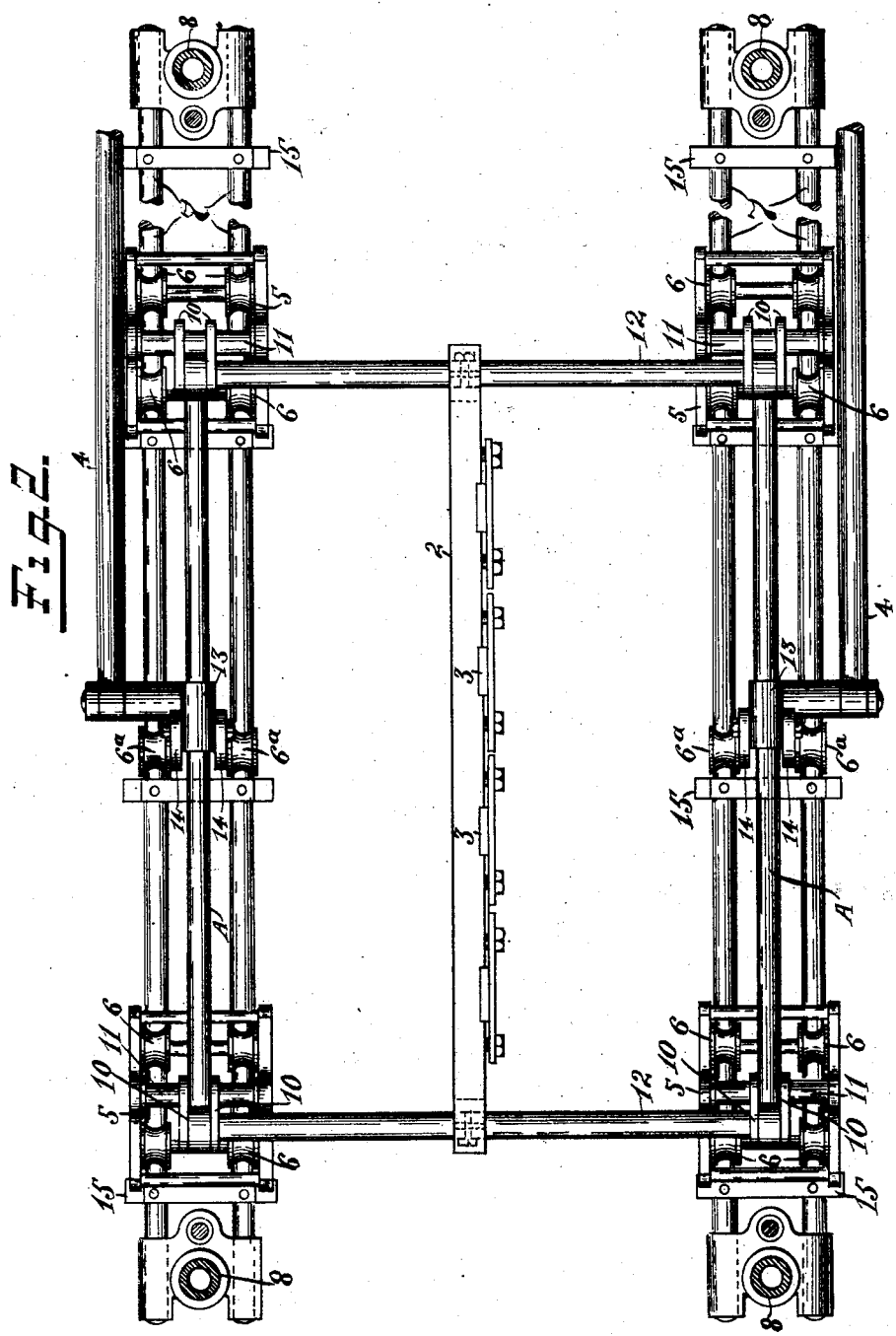
Witnesses:
Inventor
ANDREW W. LIVINGSTON.
By his Attorneys.

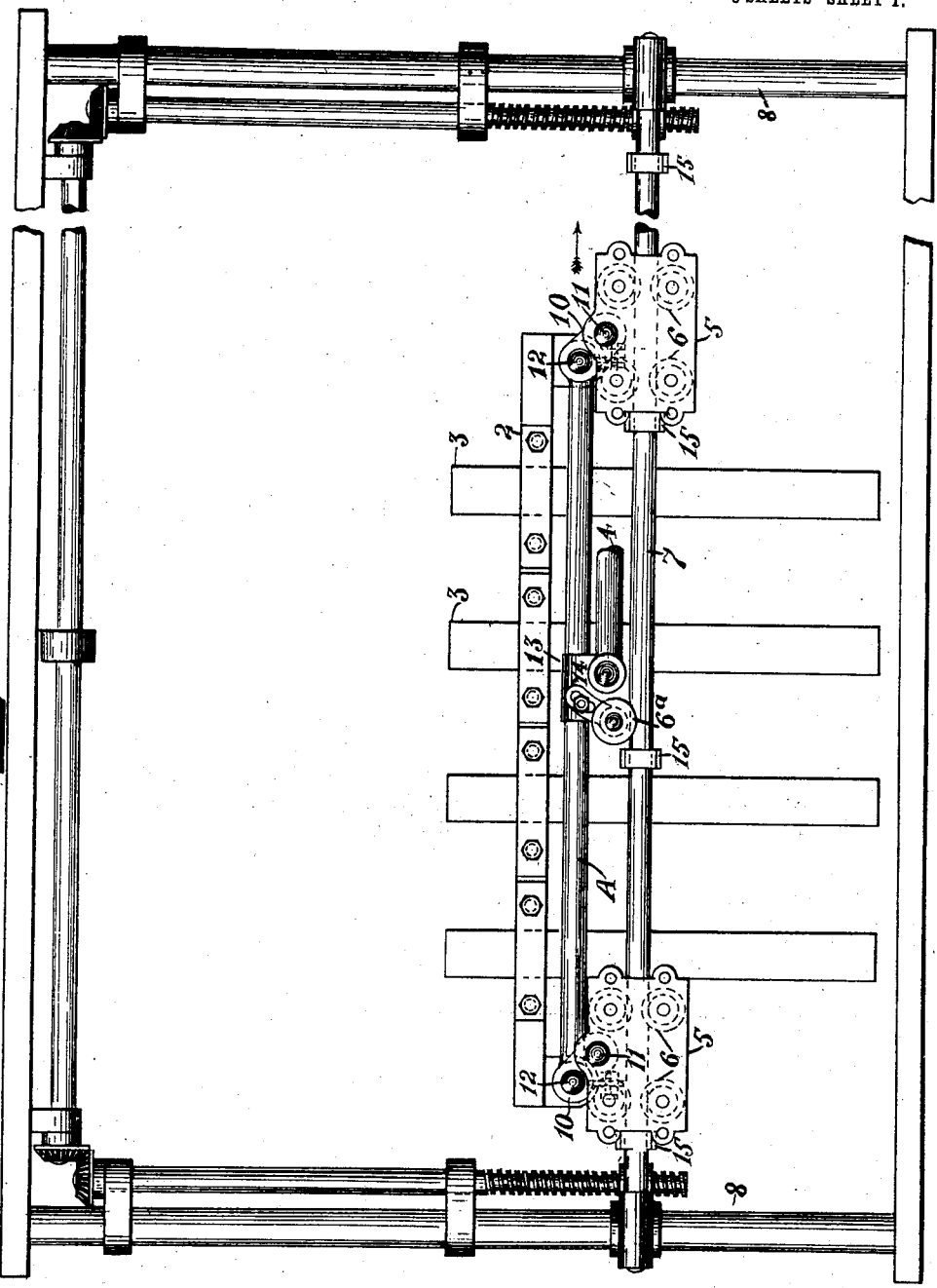

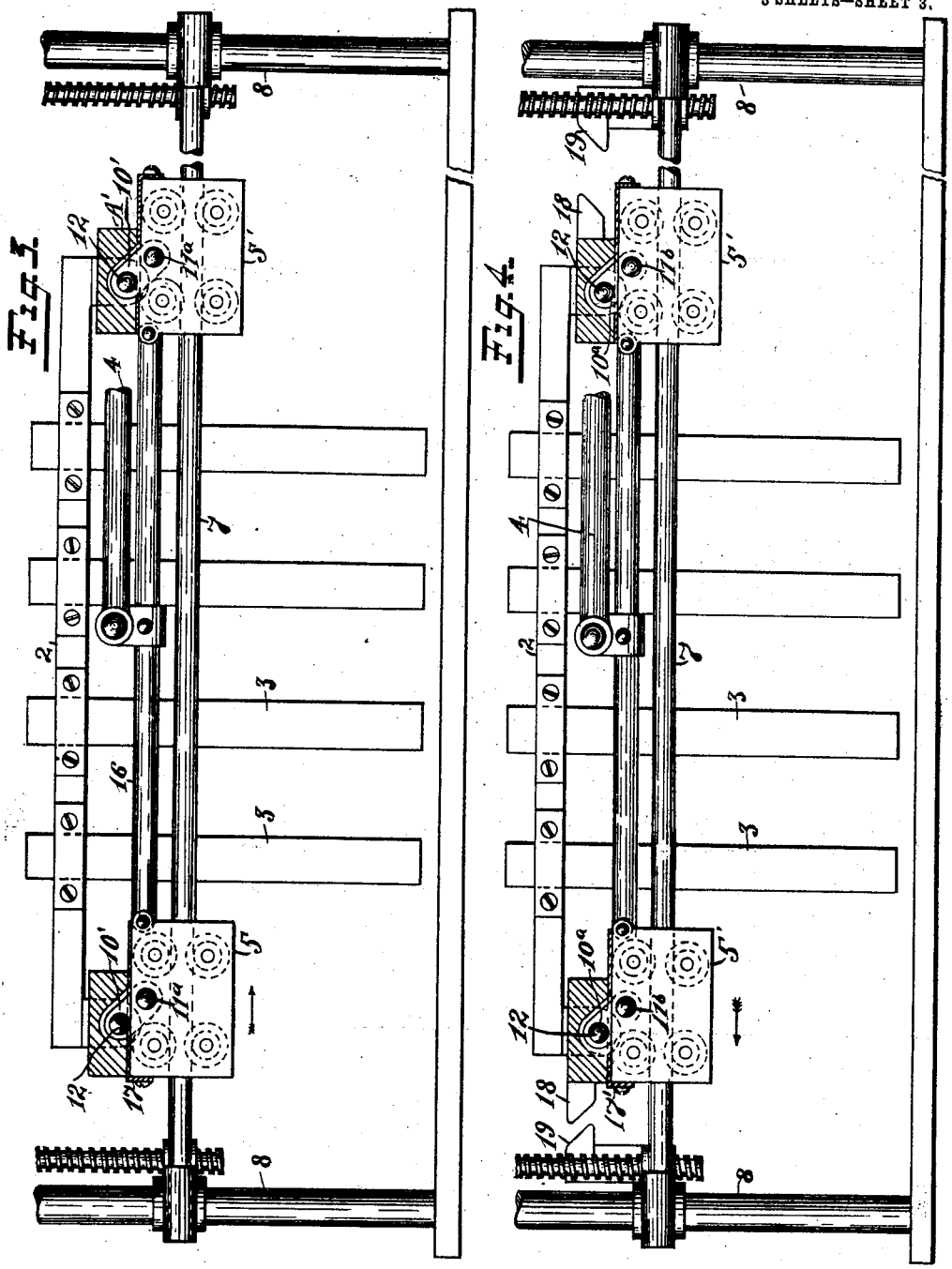

UNITED STATES PATENT OFFICE.

ANDREW W. LIVINGSTON, OF ALAMEDA, CALIFORNIA, ASSIGNOR TO THE UNITED STATES STONE SAW COMPANY, OF TUCSON, ARIZONA TERRITORY, A CORPORATION OF ARIZONA TERRITORY.

STONE-SAWING MACHINE.

No. 919,195.  Specification of Letters Patent.  Patented April 20, 1909.

Application filed September 10, 1908. Serial No. 452,457.

*To all whom it may concern:*

Be it known that I, ANDREW W. LIVINGSTON, a citizen of the United States, residing at Alameda, Alameda county, California, have invented certain new and useful Improvements in Stone-Sawing Machines, of which the following is a full, clear, and exact description.

My invention relates to improvements in stone sawing machinery.

It consists in a novel combination of parts and in details of construction which will be more fully explained by reference to the accompanying drawings, in which, Figure 1 is a side elevation of the machine embodying my invention. Fig. 2 is a plan view of the same. Figs. 3 and 4 represent modifications of my invention.

In the usual construction of stone sawing machines vertically disposed blades are carried upon a frame and the lower ends of the blades are so disposed as to rest upon the stone to be sawed. By means of suitable connections, a reciprocating motion is given to the saw carrying frame so that the ends of the blades resting upon the stone will be reciprocated across the stone in the line to be cut.

The cutting of the stone is effected by means of shot or other suitable abrading materials which are admitted into the channel in which the blades reciprocate, whereby the erosion of the stone is very rapidly effected.

The weight of the reciprocating parts of such an apparatus is so great—sometimes four or five tons—that considerable strain upon the apparatus results in the frequent reversals of direction in the straight line reciprocations, besides requiring a great amount of power.

One object of the present invention is to provide means for reversing the direction of the heavy, rapidly moving saw frame at or proximate to the end of each stroke, in such a manner as to cushion it, thereby avoiding shock and saving power. Another object is to provide for the periodical flow of the shot beneath the saw blades, and both these objects are accomplished by the same means. Accordingly I have shown a preferred form of mechanism by which the saw frame and saws are momentarily lifted at the end of each stroke, the frame and saws dropping again, so that the frame will be supported by the stone through the medium of the saw blades.

As shown in the drawings, A—A represent the side members of a rectangular frame, the end member being shown at 12—12. To the latter, saw beams 2 may be secured. These beams 2 carry the blades 3, which latter may be adjustable thereon. The frame and the saw beams are reciprocated in any suitable manner.

As here shown, 4 represents a connecting rod which extends from the reciprocating frame to a suitable motor (not shown). One connecting rod is preferably provided on each side of the frame.

5—5 are carriages or trucks provided with rollers or grooved wheels 6—6, adapted to travel upon the track 7, this track being in turn adjustably supported at the ends by the vertical standards 8, and vertically movable so that the saw carrying frame and saws may gradually move downward as the cut in the stone progresses.

The frame A is connected at its sides to the carriages or trucks 5 by links 10. The frame ordinarily lies close to the carriages, but the links permit a slight lift and longitudinal movement of the frame independent of the carriages. The links are for the purpose of momentarily raising the frame and saws and of guiding them in their rise at the end of each reciprocation. The links 10—10 are pivoted to the carriages as shown at 11, and to end pieces 12 of the frame A.

13 is a block fixed to the frame A and furnishes a connection for the rod 4.

14 is a slotted arm having rollers 6ª traveling upon the tracks or guides 7 in the same manner as the roller 6 of the carriage or truck 5. The slotted portion 14 is adjustable by means of a lock screw or other suitable device, so as to regulate the position of the rollers 6ª to correspond to that of the rollers 6 to thus maintain the saws in their parallelism as they move.

The operation of the device will then be as follows: When reciprocative motion is imparted to the frame A, the short cranks or links 10 will be inclined opposite to the direction of movement or stroke, as indicated by the arrow, Fig. 1. When the stroke is nearly completed, the carriages or trucks 5 encounter rigid stops 15 suitably arranged and supported in the path of the carriages.

These stops suddenly arrest the further movement in that direction of the carriages. The saw frame being heavy, as I have previously said, and moving quite rapidly, has such a momentum that it tends to travel onward after the sudden stoppage of the carriage or truck 5. The inclination and position of the links 10—10 is such that as the saw frame continues ahead, they will lift the saw frame and saws slightly and turn on their pivots and change their inclination to the opposite side of a vertical line through pivots 11. This lift of the frame operates as a brake, checking the saw frame with a cushioning effect and relieving strain on the mechanism. The amount of lift need ordinarily be but very little. Except when the force of inertia is operating to lift the saws and turn the links at the ends of a stroke, no considerable portion, if any, of the weight of the saws and saw frame is borne by the carriages or trucks 5 during the actual sawing operation, the weight of these parts being mainly supported by the saw blades as they rest on the stone. The carriages and rolls operate in the nature of anti-frictional guides for the frame. The lifting movement of the saw frame and blades in the manner described, not only provide the cushioning effect above referred to, but it also allows the abrading material to feed beneath the ends of the blades so that as the latter settle down again they rest directly upon said abrading material and thereby assist in the rapidity of the cutting operation. When the frame and carriages arrive nearly to the end of the opposite stroke, another set of stops are encountered by the carriages and the frame is lifted and the links tipped as before described.

In Fig. 3 I have shown a modification embodying the same principle of change of direction and lift of the saws and saw frame through the medium of the force of inertia. In this case the carriages 5' on each side of the machine are connected directly together by the bar 16, and the pitman 4' connects directly to said bar.

The frame A' and carriages 5' are chambered on their adjacent surfaces, and links 10' are housed in these chambers and are suitably pivoted at their ends, one end of each link being pivoted to the frame A and the other end to the carriage 5'. Ordinarily the frame A rests close to the carriages or trucks but the arrangement of the parts is such that each time the carriages reach the end of a stroke (determined by the stroke of the pitman 4ª) the momentum of the saw frame will cause the latter to lift on the pivots 11ª, turning on the links 10' as radii, and dropping down again with the links inclined in the opposite direction to that shown. This lift and throw of the frame will take place each time the carriages reverse their stroke and independently of any stops, such as were employed in connection with Fig. 1 where the pitman connects direct to the saw frame. The amount of lift may be regulated or varied by means of removable shims 17 insertible between the carriages and frame.

If it is deemed essential or is desired to provide a more positive means for lifting the frame A, the latter may be made with inclined or cam-like extensions 18 at the ends as is shown in the modification Fig. 4, which are adapted to contact with and run upon the adjustable and correspondingly inclined stops 19, as the frame nears the end of each stroke. In this case the links 10ª may be inclined in the direction of movement of the frame and carriages. The inclined stops 19 are carefully adjusted to the travel of the carriages so that the latter move to complete their stroke just far enough to allow the frame to be lifted and turned on the pivots 11ᵇ with the links 10ª as radii. The amount of lift may be regulated by suitable means as the shims 17'.

It should be understood that I have attempted to describe only the preferred forms of construction.

What I claim is:

1. In a stone sawing apparatus, a reciprocating saw carrying frame, a guided carriage therefor, and links connecting the carriage with the frame and means to cause said carriage to swing on said links and shift its position on said frame at the end of each reciprocal stroke of the frame.

2. In a stone sawing apparatus, a saw carrying frame, a supporting track, a carriage traveling thereon, a link connecting the saw carrying frame with the carriage, said links being movable in the arc of a circle about the point where it is pivoted to the carriage, and means for reciprocating the carriage.

3. In a stone sawing apparatus, a reciprocating saw carrying frame, a guided carriage, links for connection between the saw frame and carriage and means to cause the saw frame to swing up and over on said links at each end of its stroke, and means for varying the lift.

4. In a stone sawing apparatus, a reciprocating saw carrying frame and guided carriage, a vertically yielding connection between the saw frame and carriage, and an adjustable means to regulate the moment of operation of said vertically yielding connection.

5. In a stone sawing machine, the combination of a reciprocating saw frame, a supporting carrier therefor, pivotal connections between the carrier and frame, tracks on which the carrier is slidable, and means operating to lift the frame and turn it on said pivotal connections at the end of a stroke.

6. In a stone sawing machine, the combination of a saw frame, reciprocating carriers, rigid members pivoted to the carriers and to the frame and on which members said frame is turnable as on radii, and means to reciprocate the carriers.

7. In a stone sawing machine, a saw frame, wheeled trucks therefor and movable therewith, tracks on which said trucks are movable, means to reciprocate the frame, and means to change the direction of movement of the frame, but not the trucks, from a straight line movement into a lifting curvilinear movement at or approximately the end of each stroke.

ANDREW W. LIVINGSTON.

Witnesses:
GUY A. DUNN,
CHAS. R. LAIDLAW.